April 16, 1946.   D. A. LYON   2,398,382
METHOD FOR COATING OPTICAL ELEMENTS
Filed Nov. 17, 1942   2 Sheets-Sheet 1
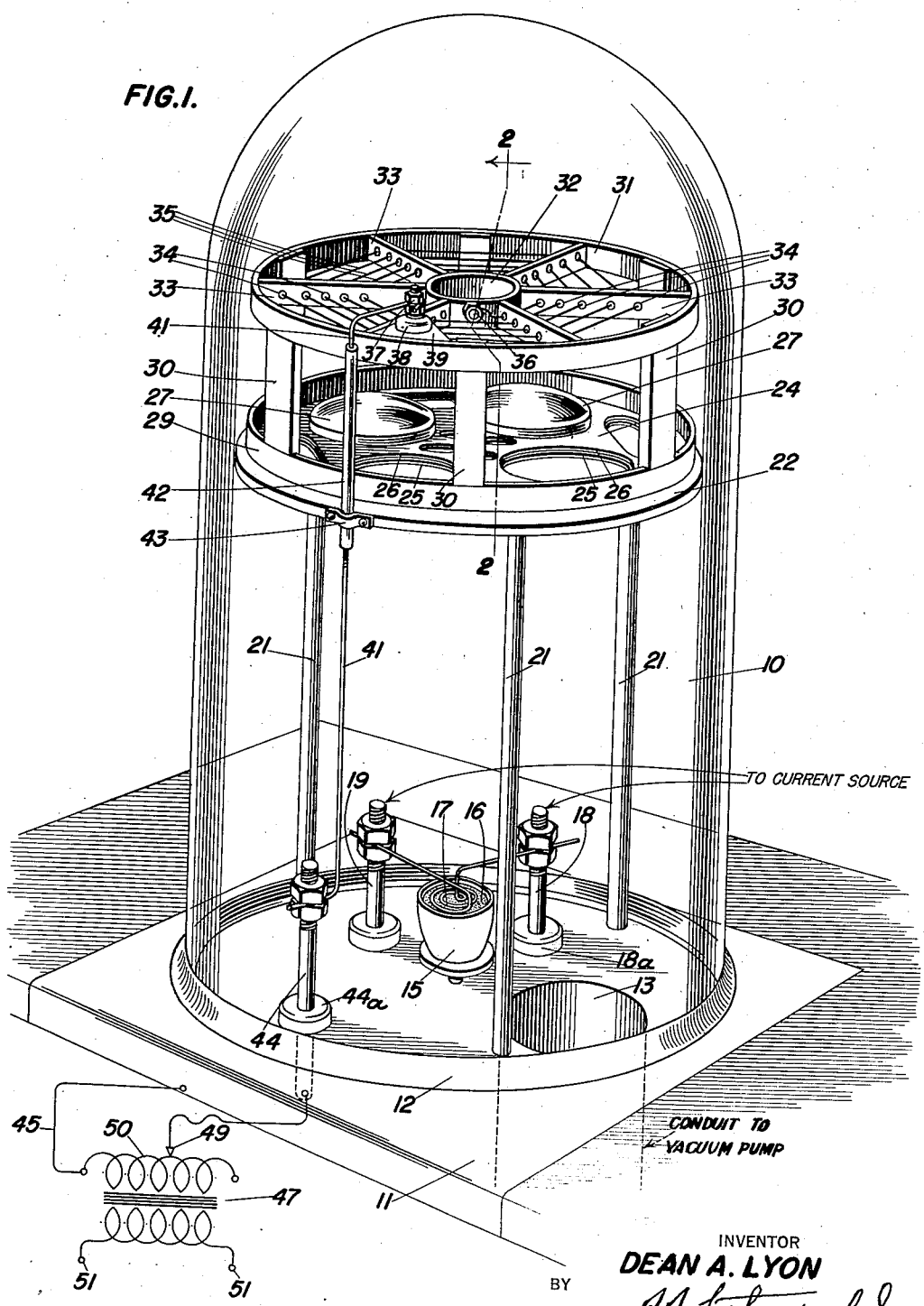
INVENTOR
DEAN A. LYON
BY
ATTORNEY April 16, 1946.  D. A. LYON  2,398,382
METHOD FOR COATING OPTICAL ELEMENTS
Filed Nov. 17, 1942  2 Sheets-Sheet 2
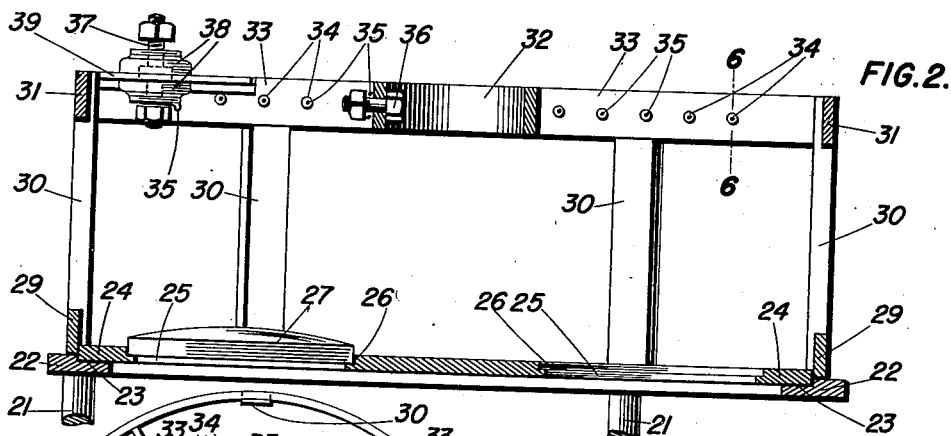
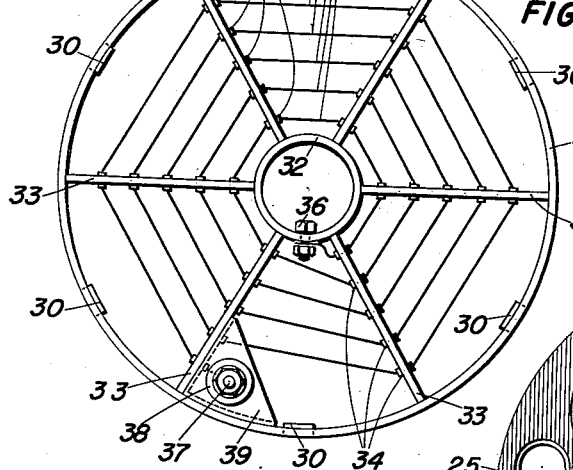
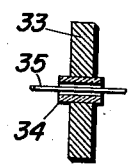
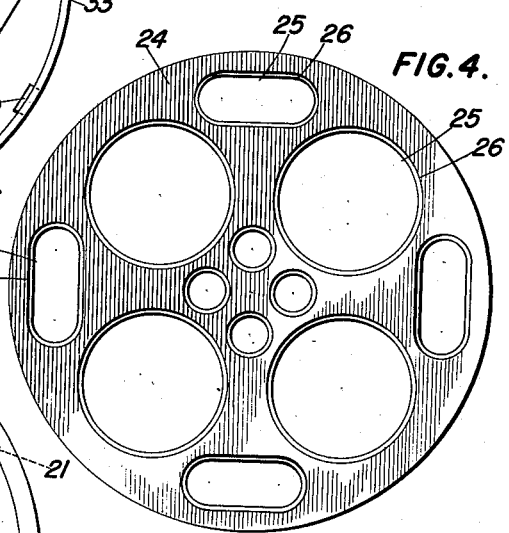
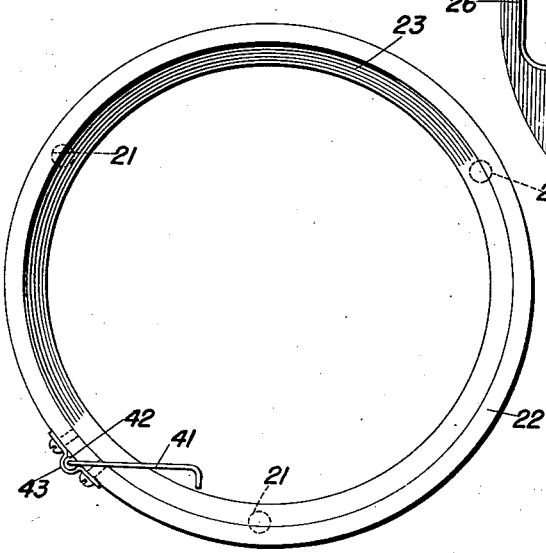
INVENTOR
DEAN A. LYON
BY
ATTORNEY Patented Apr. 16, 1946

2,398,382

UNITED STATES PATENT OFFICE 2,398,382

METHOD FOR COATING OPTICAL ELEMENTS

Dean A. Lyon, Washington, D. C.

Application November 17, 1942, Serial No. 465,917

9 Claims. (Cl. 117—54)

(Granted under the act of March 3, 1883, as amended April 30, 1928; 370 O. G. 757)

This invention relates to the art of coating optical elements and more particularly to an improved process and a new apparatus for producing a hard, durable and tenacious evaporated film on a surface of optical elements such as glass, quartz, plastics and the like. The surface of the optical element to be coated is hereinafter termed the "optical surface," and by that term, as used in the specification and claims, is meant a functioning or used surface, as contrasted with a non-functioning surface, of any optical element, such as a lens, mirror, prism, and the like.

It is already known that a film of a metallic fluoride of the appropriate optical thickness and appropriate index of refraction on the surface of a light-transmitting optical element reduces the light reflection from the surface. It is also known that to bake in an ordinary oven at an elevated temperature a clean surface to be coated, somewhat improves the tenacity of the film to the glass and also the ruggedness of the film itself. It is further known that to bake in an ordinary oven a coated element somewhat improves the tenacity and ruggedness of the film.

Present films applied to optical elements have the disadvantage that they are not sufficiently hard, durable and tenacious to resist scratching and abrasion, nor are they sufficiently hard, durable and tenacious to resist the corrosive action of atmospheric conditions in the vicinity of sea water, sea water spray, immersion in sea water, or exposure to or immersion in acids for any appreciable period of time.

An object of the present invention is to provide a process for applying an evaporated film to the optical surface or surfaces of light-transmitting optical elements such as plates, prisms, lenses, and the like, made of glass, quartz, transparent plastics and similar substances whereby the hardness, durability and tenacity of such films are substantially improved.

Another object of this invention is to provide an apparatus by means of which a surface of an optical element may be coated with an evaporated film which is hard, durable and tenacious.

A further object of this invention is to provide improved optical elements coated with a light-transmitting evaporated film which is hard, durable and tenacious.

A still further object is to provide a process for applying a hard, durable and tenacious film to optical elements so as to increase their usefulness in optical apparatus, such as range finders, telescopes, bomb sights, binoculars, cameras and the like.

These and other objects may be better understood by reference to the accompanying drawings, in which Fig. 1 is a perspective view of one form of an apparatus by means of which the invention may be practiced;

Fig. 2 is a sectional view on the line 2—2 of Fig. 1, showing one of the heating units;

Fig. 3 is a plan view of the heating unit shown in Fig. 2;

Fig. 4 is a plan view of the lens holder shown in Figs. 1 and 2;

Fig. 5 is a plan view of the support for the lens holder shown in Figs. 1 and 2, and Fig. 6 is an enlarged sectional view on the line 6—6 of Fig. 2 showing the detail of part of the heating unit.

The apparatus, as shown, comprises a bell jar 10 mounted on a metal supporting plate 11 and having a seal 12 between the jar and the plate. In the practice of the invention, a vacuum is maintained in the jar, as by connecting its interior to a vacuum pump (not shown) through a conduit 13 leading through the supporting plate.

A crucible 15 is mounted on the plate 11 within the bell jar and contains a suitable coating material 16, such as a metallic fluoride, metallic sulphide, oxide, or the like. The coating material is adapted to be vaporized by a heating filament 17 disposed in the crucible and connected at its ends to terminal 18 extending through the insulator 18a and terminal 19 grounded in the base plate 11 to a source of electric current (not shown).

Secured to the plate 11 within the bell jar are standards 21 which support a base ring 22. The base ring has formed in its upper surface an internal recess 23 for receiving a lens holder 24 having a plurality of openings 25, the upper surface of the holder being cut away to form peripheral recesses 26 around the openings for supporting the optical element to be coated, such as a lens 27.

A ring 29 is supported on top of the base ring 22 outside the lens holder 24, and extending upwardly from the ring 29 are supporting bars 30. A similar ring 31 is connected to the upper ends of the bars 30, and within the ring 31 is a hub 32 connected to the ring by spokes 33. Each of the spokes 33 is provided with a plurality of spaced insulating sleeves 34 extending through the spoke for receiving a heating wire 35. The wire is connected at one end to a terminal 36 on the hub 32 so that it is grounded to the base plate 11 through the standards 21. From the terminal 36, the heating wire extends in the form of a helix through the insulating sleeves 34 and is connected at its opposite end to another terminal 37 mounted in an insulator 38 on a web 39 secured to the ring 31 adjacent one of the spokes.

The terminal 37 may be supplied with current through a conductor 41 connected at one end to the terminal and extending downwardly through an insulator 42 secured to the base ring 22 by a bracket 43. At its lower end the conductor 41 is connected to a terminal 44 extending through an insulator 44a in the base plate 11 and connected to a variable tap-off 49 to the secondary winding 50 of a variable transformer 47. It will be apparent that the heating wire 35 is energized by a circuit traceable from one side of the secondary winding 50 through the tap-off 49, terminal 44, conductor 41, terminal 37 and back through terminal 36, hub 32, spokes 33, supporting bars 30, ring 29, base ring 22, standards 21, base plate 11 and wire 45. The transformer 47 is energized by a suitable current source 51.

In carrying out the new process, an optical piece 27 having clean surfaces is placed in the holder 24 and a suitable coating material such as a metallic fluoride, or a mixture of metallic fluorides, an oxide or a metallic sulphide, is placed in the crucible 15. The bell jar 10 is placed over the apparatus and sealed at its open end to the metal base plate 11. Evacuation of the chamber is begun and maintained through the conduit 13. At the same time the heating element 35 is heated to a suitable temperature by means of the current source 51 through a variable transformer 47. The temperature of the heating element and the distance of the heating element from the target optical piece may be varied and adjusted so as to result in a coating layer of the desired properties. In practice it has been found that suitable results may be obtained by stationing the heating element about two to three inches from the optical piece and maintaining said piece at a temperature of about 150° to 300° C. Evacuation and baking of the optical piece are continued for about an hour or until the piece is at the proper temperature and adsorbed water and grease have been evaporated from the surface. When the optical piece is at a suitable temperature and the vacuum is maintained at a suitable low pressure, vaporization of the coating material is begun as by causing current to flow through the heating filament 17 which is disposed at the crucible 15 containing the coating material 16. A sufficiently high temperature is maintained in the heating filament to cause vaporization of the coating material. The coating material vaporizes and impinges on all surfaces in its direct path, thus coating the exposed hot surfaces of the optical piece. The distance between the coating source 16 and the exposed surface of the optical piece may be adjusted to give the desired results. In practice a distance of 10 to 15 inches has been found suitable. Baking of the optical element, evacuation of the chamber and vaporization of the coating material are continued until a suitable layer of the desired thickness of the coating material has been deposited on the optical piece. Upon completion of the coating the heating filament 17 is disconnected from its current source and the heating wire 35 is disconnected from its current source. The optical piece is permitted to cool while still in the vacuum and the vacuum is then broken. Improved results have also been obtained by continuing the baking of the optical piece in the vacuum after completion of the coating. This post-baking treatment in the vacuum may be continued for 30 to 90 minutes, resulting in a layer of even greater hardness, durability, and tenacity than can otherwise be obtained.

Examples illustrative of the practice of this invention are the following:

*Example 1*

A glass lens with clean surfaces was positioned about 12 inches above a coating source of magnesium fluoride in an evacuable chamber. A heating element consisting of a spiralled resistance wire such as shown in Fig. 3 was stationed about 2 inches above the lens. Evacuation of the chamber was begun and current was caused to flow through the heating element in order to heat the target lens to a temperature of about 180° C. Baking of the lens and evacuation of the chamber were continued for about one-half hour at which time the surface of the lens was suitably hot and devoid of adsorbed layers of water and grease. Thermal vaporization of the magnesium fluoride coating material was then begun and the vaporized particles of magnesium fluoride passed through the rarefied atmosphere and were deposited as a film on the exposed surface of the hot glass lens. Vaporization was continued until a film of the desired thickness was obtained.

The magnesium fluoride film obtained was so hard, durable, and tenacious that after being immersed in synthetic sea water (a salt solution of sufficient strength and properties to equal that of ordinary sea water) for a period of over 30 days, no alteration in the physical and optical properties of the film could be detected. A similar magnesium fluoride film applied to a glass lens that had not been heated in a vacuum during evaporation of the magnesium fluoride became soft, cloudy in appearance and distintegrated after having been immersed in the same synthetic sea water for less than 24 hours. Further, the properties of the improved film were in no way altered by a thorough scrubbing in a strong soap solution; nor was the film injured by immersion in Aerosol (di-octyl sodium sulpho-succinate) for a period of 24 hours. The lens with the improved film was also consecutively boiled in water for 45 minutes, immersed in dilute nitric acid for 24 hours and covered with drops of concentrated nitric acid for 30 minutes but the physical and optical properties of the film were in no way altered by this procedure. This particular magnesium fluoride film exhibited remarkably improved properties of tenacity and ruggedness as compared with a similar film of magnesium fluoride deposited on a similar, but unheated lens in vacuum.

*Example 2*

The same process as disclosed in Example 1 was practiced with cryolite (sodium aluminum fluoride) as the coating material. The above mentioned films proved to have improved properties of hardness, durability and tenacity as compared with similar films applied to optical elements that had not been heated in a vacuum during evaporation of the coating material. Zinc sulphide, lead sulphide, and quartz films may also be successfully applied to a lens by this same process.

It is believed that the heating or baking of the optical surface so that it is hot while an evaporated layer is being deposited thereon in a vacuum imparts a hard, durable, micro-crystalline structure to the layer; whereas, the absence of heat in a vacuum during evaporation results in molecular layers of relatively soft, porous structure. The improved properties of this layer are probably caused by thermal agitation of the molecules during their deposition on the surface of the optical element which results in more uniform and homogeneous crystal growth.

The invention herein described may be manufactured and used by or for the Government of the United States of America for governmental purposes without the payment of any royalties thereon or therefor.

I claim:

1. In the process for applying a stable, water insoluble, evaporated inorganic salt on a hot optical surface by molecular deposition under vacuum to form a hard, durable, and tenacious coating layer thereon, the steps of maintaining such optical surface in a vacuum, heating said optical surface to an elevated temperature while in said vacuum, and evaporating said inorganic salt in the vicinity of said optical surface while said surface remains at an elevated temperature for causing such vaporized salt to be deposited by molecular deposition as a hard, durable, and tenacious layer on said hot surface.

2. In the process for applying a stable, water insoluble, evaporated inorganic salt on a hot light-transmitting optical surface by molecular deposition under vacuum to form a hard, durable, and tenacious coating layer thereon, the steps of maintaining such optical surface in a vacuum, heating said optical surface to an elevated temperature while in said vacuum, and evaporating said inorganic salt in the vicinity of said optical surface while said surface remains at an elevated temperature for causing such vaporized salt to be deposited by molecular deposition as a hard, durable, and tenacious layer on said hot surface.

3. In the process for applying a stable, water insoluble, evaporated light-transmitting inorganic salt on a hot optical surface by molecular deposition under vacuum to form a hard, durable, and tenacious coating layer thereon, the steps of maintaining such optical surface in a vacuum, heating said optical surface to an elevated temperature while in said vacuum, and evaporating said inorganic salt in the vicinity of said optical surface while said surface remains at an elevated temperature for causing such vaporized salt to be deposited by molecular deposition as a hard, durable, and tenacious layer on said hot surface.

4. In the process for applying a stable, water insoluble, evaporated inorganic salt on a hot optical surface by molecular deposition under vacuum to form a hard, durable, and tenacious coating layer thereon, the steps of maintaining such optical surface in a vacuum, heating said optical surface to a temperature above 150° C. while in said vacuum, and evaporating said inorganic salt in the vicinity of said optical surface while said surface remains at said elevated temperature for causing such vaporized salt to be deposited by molecular deposition as a hard, durable, and tenacious layer on said hot surface.

5. In the process for applying a stable, water insoluble, evaporated inorganic salt on a hot optical surface by molecular deposition under vacuum to form a hard, durable, and tenacious coating layer thereon, the steps of maintaining such optical surface in a vacuum, heating said optical surface to a temperature sufficiently high to substantially increase the tenacity and ruggedness of the film as compared to a film of the same material deposited upon a non-heated surface in said vacuum, and evaporating said inorganic salt in the vicinity of said optical surface while said surface remains at an elevated temperature for causing such vaporized salt to be deposited by molecular deposition as a hard, durable, and tenacious layer on said hot surface.

6. A process as specified in claim 5 in which the inorganic salt is a metallic sulphide.

7. A process as specified in claim 5 in which the inorganic salt is a metallic oxide.

8. A process as specified in claim 5 in which the inorganic salt is a metallic fluoride.

9. A process as specified in claim 5 in which the inorganic salt is magnesium fluoride.

DEAN A. LYON.